United States Patent

[11] 3,611,092

| [72] | Inventor | Alan R Wilmunder |
| | | Palo Alto, Calif. |
| [21] | Appl. No. | 11,995 |
| [22] | Filed | Feb. 17, 1970 |
| [45] | Patented | Oct. 5, 1971 |
| [73] | Assignee | The United States of America as represented by the United States Atomic Energy Commission |

[54] ELECTRONICALLY SWITCHED DYNAMIC BRAKE FOR A DC MOTOR
7 Claims, 3 Drawing Figs.

[52] U.S. Cl. .................................................. 318/258,
318/293, 318/302, 318/380
[51] Int. Cl. ..................................................... H02p 5/00
[50] Field of Search............................................ 318/257,
258, 293, 380, 331, 302

[56] References Cited
UNITED STATES PATENTS

| 3,401,325 | 9/1968 | Stringer.......................... | 318/302 |
| 3,477,006 | 11/1969 | Fair et al........................ | 318/331 |
| 3,497,786 | 2/1970 | Lombardo..................... | 318/331 |

*Primary Examiner*—Oris L. Rader
*Assistant Examiner*—K. L. Crosson
*Attorney*—Roland A. Anderson ABSTRACT: A switching circuit comprising transistors arranged to conduct driving current of either polarity to a DC motor and further arranged to be biased by the back e.m.f. of the motor, when the driving voltage falls below the back e.m.f., to switch the back e.m.f. across a damping resistor to dynamically brake the motor.

PATENTED OCT 5 1971  3,611,092
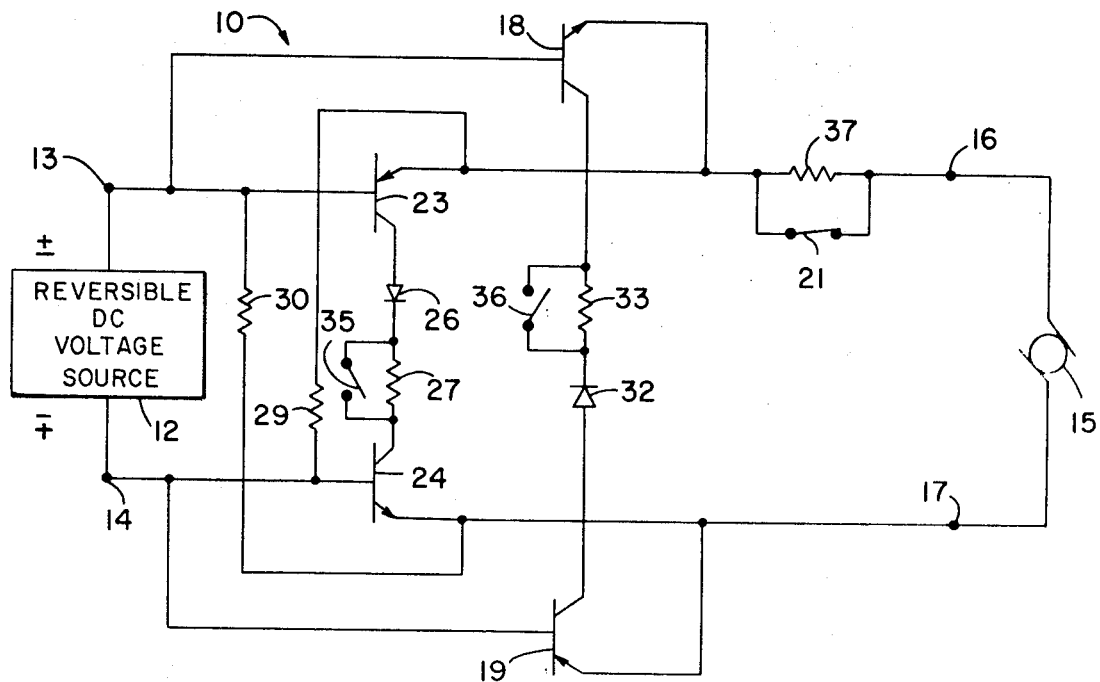
*Fig. 1*
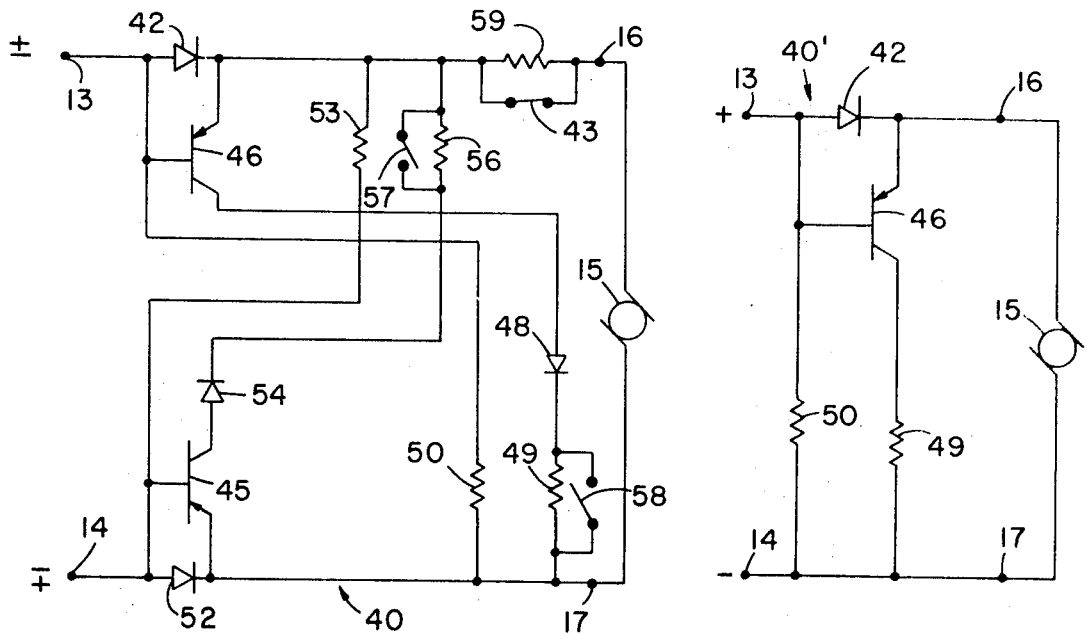
*Fig. 2*
*Fig. 3*
INVENTOR.
ALAN R. WILMUNDER
BY 3,611,092

ELECTRONICALLY SWITCHED DYNAMIC BRAKE FOR A DC MOTOR

BACKGROUND OF THE INVENTION

The invention relates to dynamic brakes, and more particularly, it relates to an electronic switch for connecting a damping resistor across a DC motor.

Motors are often used for remote control of precise operations by adjustment of electrical or electronic circuit components or adjustment of the components of a mechanical or hydraulic system. To achieve a high degree of preciseness it is necessary that the motor be stopped rapidly in order to avoid driving the motor past selected points. Dynamic braking has been found to be simpler, less expensive and less wearing than mechanical braking, and a variety of electrically and electronically controlled dynamic braking systems have been developed. However, these variously require inherently slow relay operated contacts, continuous consumption of power by the braking controls whether the motor is being braked or is running, complex electronic circuits, more than one power supply such as a separate power supply for the electronic circuit and another for the motor, and control circuits that require a channel for each direction of drive and braking. Furthermore, these circuits do not usually provide for different rates of damping for each direction of motor rotation; and they are not responsive to a power source that may be rapidly and automatically pulsed in either direction with a predetermined number of pulses for energizing a motor for a corresponding predetermined amount of rotation in a direction corresponding to the polarity of the pulses.

SUMMARY OF THE INVENTION

In brief, the invention pertains to a control circuit serially connected between a DC motor and a source of driving power for transferring power from the source to the motor when the driving voltage is greater than the back e.m.f. of the motor and for switching the back e.m.f. of the motor across a damping device whenever the driving voltage falls below the back e.m.f. thereby automatically and substantially instantaneously initiating damping of the back e.m.f. to rapidly stop rotation of the motor or to reduce its speed rapidly to that determined by the input voltage rather than let the motor approach this speed at a rate determined by inertia and friction.

It is an object of the invention to simply, automatically, and rapidly stop or reduce the speed of a DC motor by damping the back e.m.f. of the motor upon the motor driving voltage falling below the back e.m.f.

Another object is to drive a DC motor in either direction and dynamically brake the motor in either direction.

Another object is to substantially instantaneously place a damping resistor across DC motor upon the applied voltage falling below the back e.m.f. of the motor and then remove the resistor when the back e.m.f. equals the drive voltage.

Another object is to provide a different rate of dynamic braking for a DC motor for each direction of rotation of the motor.

Another object is to drive a DC motor with a series of pulses, with the motor being driven in a direction corresponding to the polarity of each pulse and being braked upon the conclusion of the pulse.

Another object is to provide braking circuit for a DC motor that is not affected by changing power supply voltage or by variation of peak voltages of successive driving pulses.

Another object is to provide a dynamic braking circuit for a DC motor which has low power consumption and is low in cost.

Another object is to serially connect a dynamic braking circuit for a DC motor between the motor and its driving source over a single channel with no other source of power or control applied to the circuit.

Other objects and advantageous features of the invention will be apparent in a description of a specific embodiment thereof, given by way of example only, to enable one skilled in the art to readily practice the invention, and described hereinafter with reference to the accompanying drawing.

BRIEF DESCRIPTION OF THE DRAWING

FIG. 1 is a schematic diagram of a first embodiment of a dynamic braking circuit for a DC motor for driving and braking the motor in either direction according g to the invention.

FIG. 2 is a schematic diagram of a second embodiment for driving and braking a DC motor in either direction of rotation.

FIG. 3 is a schematic diagram of a control circuit for driving and dynamically braking a DC motor in a single direction of rotation only.

DESCRIPTION OF A FIRST EMBODIMENT

Referring to the drawing, there is shown in FIG. 1 a dynamic braking circuit 10 having its input connected to a reversible DC voltage source 12 at input terminals 13 and 14 and its output connected to a DC motor 15 across output terminals 16 and 17. The circuit 10 is comprised of an NPN transistor 18 and PNP transistor 19 each having their base and emitter serially connected with the motor 15 across the source 12. The base of the transistor 18 is connected to the terminal 13 while its emitter is connected through a switch 21 to one brush of the motor 15. The other brush of the motor is connected to the emitter of the transistor while the base of the transistor 19 is connected to the terminal 14. A second pair of transistors, a PNP transistor 23 and an NPN transistor 24, have their emitters and collectors serially connected across the motor 15 with the emitter of the transistor 23 connected through the switch 21 to terminal 16 and the emitter of the transistor 24 connected to the terminal 17 while the collectors of the transistors are serially interconnected through a diode 26 and damping resistor 27 with the diode connected in the same direction as the emitters of transistors 23 and 24. When the voltage provided by the source 12 is positive at the terminal 13 and negative at the terminal 14, current is conducted through the base and emitter electrodes of the transistors 18 and 19 to drive the motor in a first direction. However, the drop across the base-emitter junctions of the transistors 23 and 24 is in such a direction as to back bias these junctions, thereby preventing conduction through the transistors 23 and 24. Upon removal of the voltage at the terminals 13 and 14, the back e.m.f. of the motor 15 predominates and the motor becomes a DC source having a positive polarity at the terminal 16 and a negative polarity at the terminal 17. The direction of connection of the electrodes of the transistors 18 and 19 prevents current flow therethrough under these conditions. The transistors 23 and 24, however, are biased to conduct under these conditions by means of biasing resistors 29 and 30. The resistor 29 connects the positive voltage at the terminal 16 to base of the transistor 24 while the resistor 30 connects the negative voltage at the terminal 17 to the base of the transistor 23. The base-emitter junction of the transistors 23 and 24 are thereby forward biased to conduct current from the motor 15 through the diode 26 and the damping resistor 27. The damping resistor 27 is thus placed across the motor 15 substantially instantaneously upon the source voltage 12 falling below the back e.m.f. of the motor 15 to initiate damping of the back e.m.f. and rapid dynamic braking of the motor.

To rotate the motor 15 in a second direction, the DC source is switched to provide a positive potential at the terminal 14 and a negative potential at the terminal 13. The base of the transistor 24 is connected to the terminal 14 while its emitter is connected through the terminal 17 directly to one brush of the motor 15. The other brush of the motor is connected through the terminal 16 and switch 21 to the emitter of the transistor 23. The base of the transistor 23 is connected directly to the terminal 13 to which a negative potential is applied. The direction of connection of the base-emitter junctions of the transistors 24 and 23 is in series with the motor 15 across the terminals 13 and 14 in a direction to conduct current from the source to the motor in the second direction.

Upon lowering of the voltage at the source 12 below the back e.m.f. of the motor 15, the back e.m.f. of the motor predominates and becomes a source of DC voltage with a positive potential at the terminal 17 and a negative potential at the terminal 16. A blocking diode 32 and a damping resistor 33 are serially connected with the collectors of the transistors 18 and 19. The diode 32 and transistors 18 and 19 are interconnected with the emitters and collectors of transistors 18 and 19 in a direction to conduct current from the motor 15 when it acts as a source having a positive potential at the terminal 17 and a negative potential at the terminal 16. The transistors 18 and 19 are biased to conduct under these conditions by means of the resistors 29 and 30, with the negative potential at the terminal 16 being applied through the resistor 29 to the base of the transistor 19 and the positive potential at the terminal 17 being applied through the resistor 30 to the base of the transistor 18. The emitter-base junctions of the transistors 18 and 19 are forward biased thereby, causing the transistors to conduct current from the motor 15 through the damping resistor 33 to substantially instantaneously initiate damping of the back e.m.f. of the motor upon the driving voltage falling below the back e.m.f. of the motor.

The function of the diodes 26 and 32 is to ensure that current is blocked from flowing from the source through the respective serially connected damping resistors 27 and 33.

It will be noted from the foregoing description that for a first polarity of voltage at the source 12 the transistors 18 and 19 act as conducting switches through which driving current is supplied to the motor 15 while the transistors 23 and 24 act as conducting switches through which damping current from the motor is applied to the transistor 27; and for a second polarity of voltage at the source 12 the transistors 23 and 24 act as conducting switches through which driving current is supplied to the motor 15 while the transistors 18 and 19 act as conducting switches through which damping current from the motor is applied to the resistor 33.

The damping resistors 27 and 33 may be made equal to provide equal dynamic braking characteristics for each direction of rotation for the motor 15. However, it may be desired to provide different rates of dynamic braking for each direction of rotation of the motor. Different braking rates may be obtained by adjusting the values of the resistors 27 and 33. A second and convenient method for obtaining equal dynamic braking rate for each direction is to remove the resistors 27 and 33 from the circuit by closing a pair of switches 35 and 36 and opening the switch 21 to place a resistor 37 in series with the motor 15. With this arrangement the damping current for either direction of rotation of the motor 15 is conducted through the resistor 37 to dynamically brake the motor at the same rate for each direction of rotation.

The source 12 may be either a steady source of DC potential or it may be a pulse source. In either case the direction of rotation of the motor 15 will correspond to the polarity of the voltage at the source and will be dynamically braked substantially instantaneously upon reduction of the voltage at the source below the back e.m.f. of the motor.

It will be further noted that the control circuit 10 may also be used as a speed control circuit for the motor 15 whereby the speed of the motor is proportional to the level of voltage at the source. Thus, upon lowering the voltage of the source, the motor is dynamically braked during the period that the back e.m.f. of the motor is greater than the voltage of the source. The speed of the motor thereby drops until the voltage of the source is again equal to or greater than the back e.m.f. to drive the motor at a lower speed that is proportional to the lower voltage of the source. The speed of the motor thereby drops until the voltage of the source is again equal to or greater than the back e.m.f. to drive the motor at a lower speed that is proportional to the lower voltage of the source. Thus, the speed of the motor 15 may be adjusted to closely follow the voltage level of the source 12.

DESCRIPTION OF A SECOND EMBODIMENT

Referring to the drawing there is shown in FIG. 2 a dynamic braking circuit 40 which is a second embodiment of the invention. The circuit 40 is arranged to conduct driving power from the terminals 13 and 14 to output terminals 16 and 17 to drive the motor 15 and is further arranged to dynamically brake the motor 15 upon the voltage across the terminals 13 and 14 falling below the back e.m.f. of the motor. The circuit 40 includes a diode 42 connected in a direction to apply a positive voltage from terminal 13 to one brush of the motor 15 through a closed switch 43 and the terminal 16. The other brush of the motor is connected through the terminal 17 to the emitter of a PNP transistor 45 which has its base connected directly to the input terminal 14. When the driving voltage applied to the input terminals is positive at the terminal 13 and negative at the terminal 14, driving current is conducted from the terminal 13 through the diode 42 to one brush of the motor 15 and out of the other brush of the motor through the emitter and base of the transistor 45 to the terminal 14 to drive the motor 15 in a first direction.

The circuit 40 further includes a PNP transistor 46 having its emitter connected to the cathode of diode 42 and its base connected to the anode of the diode. The collector of the transistor 46 is serially connected with a blocking diode 48 and a damping resistor 49 to the terminal 17. The base of the transistor 46 is connected through a resistor 50 to the terminal 17. Upon the driving current that is applied to the input terminals 13 and 14 falling below the back e.m.f. of the motor 15, the back e.m.f. predominates and the source 15 acts as a DC source causing the potential at terminal 16 to become more positive than the potential at terminal 13 so that the diode 42 ceases to conduct driving current. Under these conditions the positive potential at the terminal 16 is applied to the emitter of the transistor 46 while the negative potential at the terminal 17 is applied through the resistor 50 to the base of the transistor 46, thereby biasing the base-emitter junction in a forward direction. This causes the transistor 46 to conduct damping current from the motor 15 through the diode 48 to the damping resistor 49 to dynamically brake the motor 15.

When a driving voltage is applied to the input terminals 13 and 14 such that a positive potential is applied to the input terminal 14 and a negative potential is applied to the input terminal 13, motor driving current is conducted through a diode 52 which has its anode connected to the input terminal 14 and the base of the transistor 45 and its cathode connected to the emitter of the transistor 45 and the output terminal 17. Current is thereby conducted from the terminal 17 to the terminal 16 through the motor 15, the switch 43 and the emitter-base junction of the transistor 46 to the terminal 13 to drive the motor 15 in a second direction. Upon the voltage across the terminals 13 and 14 falling below the back e.m.f. of the motor 15, the motor acts as a DC source with a positive potential at the terminal 17 and negative potential at the terminal 16. The negative potential at the terminal 16 is applied through a resistor 53 to the base of the transistor 45 while the positive potential of the terminal 17 is applied to the emitter of the transistor 45, thereby creating a forward bias at the base-emitter junction of the transistor 45. This causes a damping current to be heavily conducted through the transistor 45, a blocking diode 54 and a damping resistor 56 which are serially connected with the collector of the transistor 45 to the terminal 16. Consumption of power in the resistor 56 thereby dynamically brakes the motor 15 in the second direction.

The diodes 42 and 52 permit driving power to be conducted to the motor 15 in their respective forward directions and further provide isolation between the emitter and base electrodes of the transistors 46 and 45 respectively to permit their base-emitter junctions to be forward biased when the driving voltage falls below the back e.m.f. of the motor.

Similar to the circuit 10, the circuit 40 may be adjusted to give different rates of dynamic braking for each direction of rotation of the motor 15 by adjusting the values of the damping resistors 49 and 56. To obtain equal braking rates for either direction of rotation of the motor, the resistors 49 and 56 may be removed from the circuit and replaced by a single damping resistor 59. The resistors 49 and 56 may be removed by closing a pair of switches 57 and 58 and the resistor 59 inserted by opening the switch 43.

The blocking diodes 48 and 54 prevent application of driving voltages across the base-collector junctions of the transistors 46 and 45 respectively.

The functions of the circuit 40 with respect to the input terminals 13 and 14 and the output terminals 16 and 17 are identical to those of the circuit 10 with regard to reversibility of driving voltages, speed control and dynamic braking.

Where it is necessary to drive a DC motor in one direction only it is convenient to modify the circuit 40 of FIG. 2 to circuit 40' shown in FIG. 3 wherein the components for one direction of drive and dynamic braking are retained while the components for other direction of drive and braking are removed. The operation of circuit 40' is identical to the operation of the circuit 40 wherein a driving voltage is applied to the input terminals 13 and 14 having a positive potential at the terminal 13 and a negative potential to the terminal 14. The operation of the circuit 40' should therefore be clear from the earlier discussion.

In an embodiment exemplifying the invention, a 1/100-HP motor was driven at a rate of 100 pps with square DC pulses having a peak amplitude of 10 volts. The motor was dynamically braked from a speed of 600 r.p.m. to a complete stop in 2 seconds. Without braking the motor would coast from 600 r.p.m. to a complete stop within a period of 10–20 seconds.

While an embodiment of the invention has been shown and described, further embodiments or combinations of those described herein will be apparent to those skilled in the art without departing from the spirit of the invention.

What I claim is:

1. A dynamic braking circuit for automatically and substantially instantaneously initiating damping of the back e.m.f. of a DC motor driven in a first direction with a driving voltage of a first polarity from a DC source upon the driving voltage falling below the back e.m.f. of the motor, comprising:
   first means for conducting the driving voltage to the motor when the driving voltage is greater than the back e.m.f. of the motor;
   damping means:
   second means operable in response to the driving voltage falling below the back e.m.f. of the motor for switching the back e.m.f. across said damping means; and
   means for reversing the driving voltage to be of a second polarity for driving the motor in a second direction,
   said second means being operable for conducting the second polarity driving voltage to the motor when the driving voltage is greater than the back e.m.f.,
   said first means being operable in response to the second polarity driving voltage falling below the back e.m.f. of the motor for switching the back e.m.f. across the damping means, and
   said damping means including first and second damping devices, said first device being serially connected with said first means and said second device being serially connected with said second means.

2. The dynamic braking circuit of claim 1, wherein said first means is a diode serially connected with said motor for applying said first polarity voltage across said motor and for conducting driving current from said source to said motor, an
wherein said second means includes an electronic switch having first, second and third electrodes, said first and second electrodes being current conducting electrodes connected in series with said damping means across said motor, said third electrode being a control electrode connected with said first electrode across said diode, and means for biasing said switch to a conduction state upon said driving voltage falling below the back e.m.f. of said motor.

3. The dynamic braking circuit of claim 1 wherein said first means comprises a first NPN transistor and a first PNP transistor having their base and emitter electrodes serially connected in a first direction with the motor across the source and further having their emitter and collector electrodes serially connected with said damping means across the motor,
   said second means comprises a second NPN transistor and a second PNP transistor having their base and emitter electrodes serially connected in a second direction with the motor across the source and their emitter and collector electrodes serially connected across the motor,
   wherein the bases of said first NPN transistor and said second PNP transistor are connected together to one terminal of said source, and
   the bases of said first PNP transistor and said second NPN transistor are connected together to the other terminal of said source.

4. The dynamic braking circuit of claim 1, wherein said damping means is a single device serially connected with said motor to provide equal dynamic braking rates for each direction of rotation of said motor.

5. The dynamic braking circuit of claim 1, wherein said first and second damping devices have different values to provide differential braking rates for each direction of rotation of said motor.

6. The dynamic braking circuit of claim 1
   wherein said first means comprises a first diode and first electronic switch having first, second and third electrodes, said first diode and said first and third electrodes of said first switch being serially connected with said motor in a first direction,
   said second means comprises a second diode and second electronic switch having first, second and third electrodes, said first and third electrodes of said second switch and said second switch and said second diode being serially connected with said motor in a second direction,
   said first and third electrodes of said second switch being connected across said first diode,
   said first and third electrodes of said first switch being connected across said second diode,
   said first and second electrodes of said first switch being connected across said motor,
   said first and second electrodes of said second switch being connected across said motor,
   means for biasing said first switch to conduct damping current from said motor to said damping means upon said source voltage falling below said back e.m.f. of said motor during rotation in the first direction, and
   means for biasing said second switch to conduct damping current to said damping means upon the source voltage falling below the back e.m.f. of the motor during rotation of said motor in the second direction.

7. The dynamic braking circuit of claim 6, wherein said first and second electronic switches are PNP transistors, and said first, second and third electrodes of each transistor is an emitter electrode, a collector electrode and a base electrode respectively.